United States Patent
Kim et al.

(10) Patent No.: US 9,985,728 B2
(45) Date of Patent: May 29, 2018

(54) METHOD AND APPARATUS FOR TRANSMITTING VISIBILITY FRAME ACCORDING TO SETTING OF SLEEP MODE IN VISIBLE LIGHT COMMUNICATION SYSTEM

(75) Inventors: Do-Young Kim, Gyeonggi-do (KR); Clint F. Chaplin, San Jose, CA (US); Eun-Tae Won, Seoul (KR)

(73) Assignee: Samsung Electronics Co., Ltd (KR)

( * ) Notice: Subject to any disclaimer, the term of this patent is extended or adjusted under 35 U.S.C. 154(b) by 156 days.

(21) Appl. No.: 13/075,787

(22) Filed: Mar. 30, 2011

(65) Prior Publication Data
US 2011/0243570 A1 Oct. 6, 2011

(30) Foreign Application Priority Data
Mar. 31, 2010 (KR) .................. 10-2010-0029594

(51) Int. Cl.
| H04B 10/116 | (2013.01) |
| H04B 10/114 | (2013.01) |
| H04W 52/02 | (2009.01) |
| H04W 28/18 | (2009.01) |
| H04W 48/08 | (2009.01) |

(52) U.S. Cl.
CPC ......... *H04B 10/116* (2013.01); *H04B 10/114* (2013.01); *H04W 52/0235* (2013.01); *H04W 52/0267* (2013.01); *H04W 28/18* (2013.01); *H04W 48/08* (2013.01); *Y02B 60/50* (2013.01); *Y02D 70/00* (2018.01)

(58) Field of Classification Search
CPC .............................................. H04W 52/0216
USPC ......... 370/311; 455/343.2, 343.3, 343.4, 574
See application file for complete search history.

(56) References Cited

U.S. PATENT DOCUMENTS

| 6,622,251 | B1 * | 9/2003 | Lindskog et al. ............ 713/300 |
| 7,564,810 | B2 * | 7/2009 | Hernandez et al. .......... 370/311 |
| 2006/0030305 | A1 * | 2/2006 | Lee et al. ...................... 455/418 |
| 2007/0147843 | A1 | 6/2007 | Fujiwara |

(Continued)

FOREIGN PATENT DOCUMENTS

| EP | 1 594 233 | 11/2005 |
| KR | 1020080108732 | 12/2008 |
| WO | WO 2009/104921 | 8/2009 |

OTHER PUBLICATIONS

European Search Report dated Apr. 5, 2016 issued in counterpart application No. 11763030.1-1855, 8 pages.

*Primary Examiner* — Robert M Morlan
(74) *Attorney, Agent, or Firm* — The Farrell Law Firm, P.C.

(57) ABSTRACT

An apparatus and method for determining whether to output a visibility frame by a Visibility Light Communication (VLC) device according to a setting of a sleep mode is provided. The method includes receiving a sleep mode request message; and transmitting a response message indicating a sleep mode period in response to the received sleep mode request message, wherein the response message includes information indicating at least one first window period in which data transmission and reception are stopped, information indicating at least one second window period in which data transmission and reception can be performed in a normal state, and setting information for determining whether to transmit a visibility frame during at least a period of the sleep mode period.

16 Claims, 14 Drawing Sheets

(56) References Cited

U.S. PATENT DOCUMENTS

| | | | |
|---|---|---|---|
| 2007/0274244 A1* | 11/2007 | Yoon | H04W 52/0216 370/311 |
| 2008/0075026 A1* | 3/2008 | Son | H04W 52/0216 370/311 |
| 2009/0022496 A1 | 1/2009 | Shin et al. | |
| 2009/0028558 A1 | 1/2009 | Choi et al. | |
| 2010/0002665 A1* | 1/2010 | Oguchi | H04W 52/0216 370/338 |
| 2010/0067421 A1 | 3/2010 | Gorokhov et al. | |
| 2010/0279745 A1* | 11/2010 | Westcott | H04W 52/0274 455/574 |
| 2011/0044287 A1* | 2/2011 | Park et al. | 370/331 |
| 2011/0064405 A1 | 3/2011 | Rajagopal et al. | |
| 2011/0069971 A1 | 3/2011 | Kim et al. | |
| 2012/0014245 A1* | 1/2012 | Park | H04L 1/1832 370/216 |

* cited by examiner

METHOD AND APPARATUS FOR TRANSMITTING VISIBILITY FRAME ACCORDING TO SETTING OF SLEEP MODE IN VISIBLE LIGHT COMMUNICATION SYSTEM

PRIORITY

This application claims priority under 35 U.S.C. § 119(a) to a Korean Patent Application filed in the Korean Intellectual Property Office on Mar. 31, 2010 and assigned Serial No. 10-2010-0029594, the entire contents of which are incorporated herein by reference.

BACKGROUND OF THE INVENTION

1. Field of the Invention

The present invention generally relates to a Visible Light Communication (VLC) system, and more particularly, to a method and apparatus for transmitting a visibility frame according to a sleep mode setting.

2. Description of the Related Art

Recently, the exhaustion of Radio Frequency (RF) band frequencies, potential crosstalk between several wireless communication technologies, an increasing demand for communication security, and the advent of an ultra-high speed ubiquitous communication environment based on $4^{th}$-Generation (4G) wireless technologies have increased interest in radio over fiber technologies complementary to RF technologies. Consequently, research on visible light wireless communication employing visible light LEDs is now in progress by many enterprises and laboratories.

Visible Light Communication (VLC) for transferring information by using visible light has advantages in that VLC enables communication through widely available bandwidth without regulation. In addition, since users can observe the place at which light corresponding to a VLC communication arrives, as well as direction along which the light travels, it is also possible to accurately ascertain information regarding coverage. VLC can also offer reliable security and low power consumption. In light of these and other advantages, VLC can be applied in locations where the use of RF communications is prohibited, such as hospitals or airplanes, and can also provide additional information services through electronic display boards.

A VLC system generally includes various VLC devices, such as a Base Station (BS) and a VLC terminal. The BS may include one or more light sources, such as an LED and a Laser Diode (LD), to perform an illuminating function and transmit data using visible light. The BS may further include a communication control device that processes data transmitted and received by the light source, thus acting as an Access Point (AP). The BS may also transmit data to and receive data from the VLC terminal. The VLC terminal includes a visible light transmission/reception module for transmitting data to and receiving data from the BS through the light source. The VLC terminal may be a portable terminal such as a cellular phone, a Personal Digital Assistant (PDA), etc., or a fixed terminal such as a desktop computer. The VLC terminal may also transmit data to and receive data from another VLC terminal by using visible light. VLC may also be used more efficiently in combination with a communication system using other wired/wireless communication media.

VLC systems support various communication schemes to improve efficiency and convenience for users. For example, as in conventional communication systems, a VLC system may include a sleep mode used during non-data-transmission periods to reduce power consumption of the VLC terminal. Once the sleep mode is set, data is transmitted and received only during a listening period, without transmitting and receiving data in a sleep period, thereby reducing unnecessary power consumption. Therefore, VLC terminals or VLC devices establish an association with each other before setting the sleep mode, which reduces power consumption of the VLC terminal.

In order to indicate visibility between VLC devices, a visibility frame is used. A visibility frame may be output from a VLC device during a period when the VLC device does not transmit data, when misalignment occurs between VLC devices that are currently communicating with each other, or a data transmission error occurs. The visibility frame is not a frame for transmission of particular data, and thus the visibility frame merely includes minimum identification information and a visually identifiable light wavelength band is used.

When using a visibility frame, once a VLC device corresponding to a transmission end of the VLC system transmits data, the transmission end looks brighter than a reception end, as a result of transmitting data by using light. However, in the reception end that merely receives data, flicker may occur. In a non-data-transmission period, the brightness of a light source is reduced. In this case, by outputting the visibility frame in the non-data-transmission period of the VLC device, uniform brightnesses of the transmission end and the reception end, respectively, may be maintained.

In a conventional sleep mode, a sleep period and a listening period have fixed durations and are periodically repeated. Since the sleep mode is set when there is no data to be transmitted, data may not be actually transmitted or received also in the listening period. Therefore, it is necessary to adaptively change the sleep period or the listening period.

The visibility frame is output when data transmission is not performed, such that the visibility frame may also be output in the sleep mode. In this case, power consumption may increase due to the visible frame. Therefore, it is necessary to determine setting of the sleep mode and operations of the VLC terminal according to the setting of the sleep mode in the VLC system, taking various conditions into account.

SUMMARY OF THE INVENTION

Accordingly, an aspect of the present invention provides a method and apparatus for reducing power consumption of a VLC device while maintaining visibility effects.

Another aspect of the present invention provides a method and apparatus for setting a sleep mode adaptively according to the amount of transmission data or a point in time for transmission, and selecting whether to transmit a visibility frame.

Moreover, yet another aspect of the present invention provides a method and apparatus for transmitting a visibility frame in a sleep mode adaptively according to a communication environment to reduce power consumption.

According to an aspect of the present invention, there is provided a method for transmitting a visibility frame according to setting of a sleep mode in a Visible Light Communication (VLC) device. The method includes receiving a sleep mode request message and transmitting a response message indicating a sleep mode period in response to the received sleep mode request message, wherein the response message includes information indicating at least one first window period in which data transmission and reception are stopped, information indicating at least one second window period in which data transmission and reception can be performed in a normal state, and setting information for determining whether to transmit a visibility frame during at least a period of the sleep mode period.

According to another aspect of the present invention, an apparatus for transmitting a visibility frame according to setting of a sleep mode in a Visible Light Communication (VLC) device is provided. The apparatus includes a light emitting device for transmitting data and a message; a photosensitive device for receiving data and a message; and a controller for receiving a sleep mode request message through the photosensitive device and transmitting a response message indicating a sleep mode period in response to the received sleep mode request message, wherein the response message includes information indicating at least one first window period in which data transmission and reception are stopped, information indicating at least one second window period in which data transmission and reception can be performed in a normal state, and setting information for determining whether to transmit a visibility frame during at least a period of the sleep mode period.

BRIEF DESCRIPTION OF THE DRAWINGS

The above and other features and advantages of embodiments of the present invention will be more apparent from the following detailed description taken in conjunction with the accompanying drawings, in which.

DETAILED DESCRIPTION OF THE EMBODIMENTS

Figure 1:
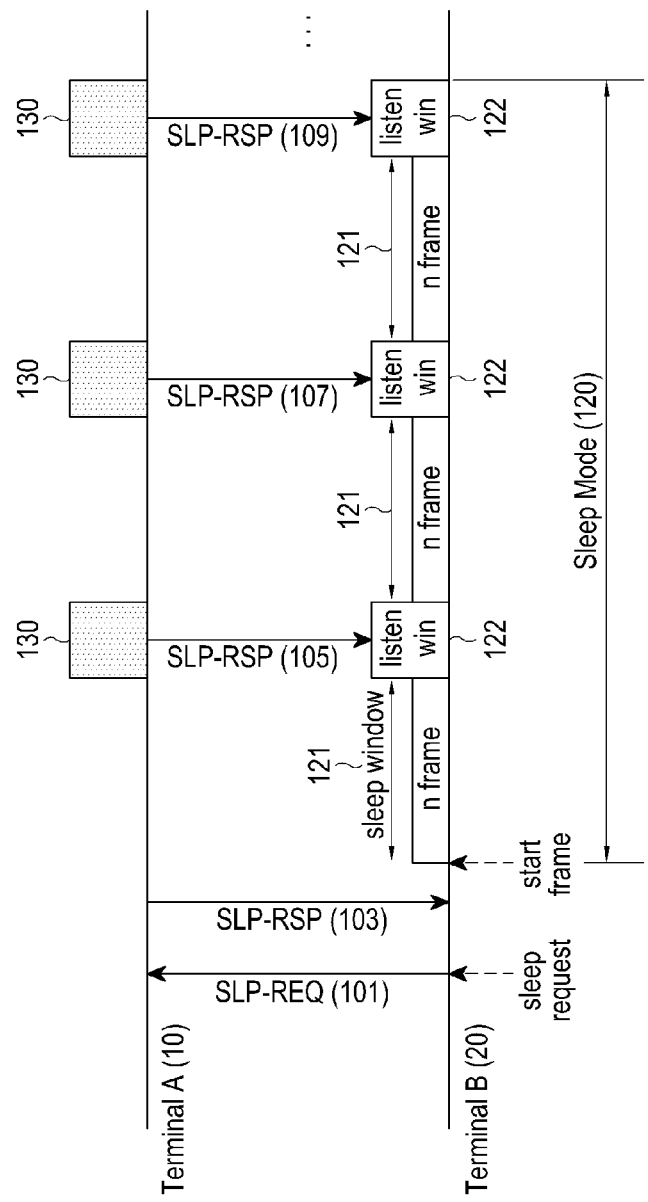
FIG. 1 is a diagram illustrating a general sleep mode setting process.

Hereinafter, embodiments of the present invention will be described in detail with reference to the accompanying drawings. It should be noted that throughout the drawings, the same drawing reference numerals and symbols refer to the same elements, features and structures. Detailed descriptions of well-known functions and constructions are omitted for clarity and conciseness.

FIG. 1 is a diagram illustrating a general sleep mode setting process using Visible Light Communication (VLC).

Referring to FIG. 1, data is transmitted from a VLC terminal A (also referred to herein as "terminal A") 10 to a VLC terminal B (also referred to herein as "terminal B") 20, such that the terminal A 10 is a transmitting terminal and the terminal B 20 is a receiving terminal.

In step 101, the terminal A 10 transmits a sleep request message SLP-REQ to the terminal B 20 to request a sleep mode for reducing power consumption. The terminal B 20, upon receiving the SLP-REQ message, transmits a sleep response message SLP-RSP to the terminal A 10 to apply the sleep mode, in step 103. In the VLC system according to FIG. 1, transmission of information for sleep mode setting is performed in a communication system control information period or common information period allocated to a terminal, which is present in a communication frame.

Table 1 below includes examples of message types that may be used in various VLC systems, among which a message of Message Type 7 and a message of Message Type 8 are used for the SLP-REQ message and the SLP-RSP message, respectively. An SLP-REQ message may be configured as shown in Table 2, and an SLP-RSP message may be configured as shown in Table 3. The SLP-REQ message may include information about a sleep start time (or frame), a sleep window size, and a listening window size of a sleep mode. A sleep window indicates a period in which an idle state is maintained. A listening window indicates a period in which data is transmitted and received after returning from the idle state back into a normal state.

The SLP-RSP message is a message indicating a response to the SLP-REQ message. The SLP-RSP message is configured in a manner similar to the SLP-REQ message, as the size of the sleep window or the listening window and the sleep start time can be set by either of the receiving terminal or the transmitting terminal in the sleep mode setting process.

TABLE 1

| Type | Message Name | Message Description |
| --- | --- | --- |
| 0 | Null | No Management Message |
| 1 | AS-REQ | Association Request Message |
| 2 | AS-RSP | Association Response Message |
| 3 | DAS-REQ | Disassociation Request Message |
| 4 | DAS-RSP | Disassociation Response Message |
| 5 | ARQ-FBK | ARQ-Feedback Message |
| 6 | Reserved | Reserved |
| 7 | SLP-REQ | Sleep Request Message |
| 8 | SLP-RSP | Sleep Response Message |
| 9 | AS-ACK | Association Acknowledgement Message |
| 10 | DAS-ACK | Disassociation Acknowledgement Message |
| 11-255 | Reserved | Reserved |

TABLE 2

| Syntax | Size (bits) | Description |
| --- | --- | --- |
| Management Message Type = 7 | | |
| Operation | 2 | 0 = Power Saving Activation Request<br>1 = Power Saving Deactivation Request<br>2 = Reserved<br>3 = Reserved |
| Sleep Start | 4 | If Operation == 1<br>Time to First Sleep Window (in units of 5 ms) |

TABLE 2-continued

| Syntax | Size (bits) | Description |
| --- | --- | --- |
| Sleep Window Size | 4 | Else 0<br>If Operation = = 1<br>Sleep Window Size (in units of 5 ms)<br>Else 0 |
| Listening Window Size | 4 | If Operation = = 1<br>Listening Window Size (in units of 5 ms)<br>Else 0 |
| Reserved | 2 | |

TABLE 3

| Syntax | Size (bits) | Description |
| --- | --- | --- |
| Management Message Type = 8 | | |
| Operation | 2 | 0 = Approved, Activation of Power Saving<br>1 = Approved, Deactivation of Power Saving<br>2 = Not Approved<br>3 = Reserved |
| Sleep Start | 4 | If Operation = = 1<br>Time to First Sleep Window (in units of 5 ms)<br>Else 0 |
| Sleep Window | 4 | If Operation = = 1<br>Sleep Window Size (in units of 5 ms)<br>Else 0 |
| Listening Window | 4 | If Operation = = 1<br>Listening Window Size (in units of 5 ms)<br>Else 0 |
| Reserved | 2 | |

Referring back to FIG. 1, if a sleep mode 120 is set according to the messages exchanged in steps 101 and 103, a sleep window 121 starts at a start frame and upon expiration of the sleep window 121, a listening window 122 starts. This process repeats periodically, such that the terminal B 20 receives transmission data 130 in steps 105 through 109.

Figure 2:
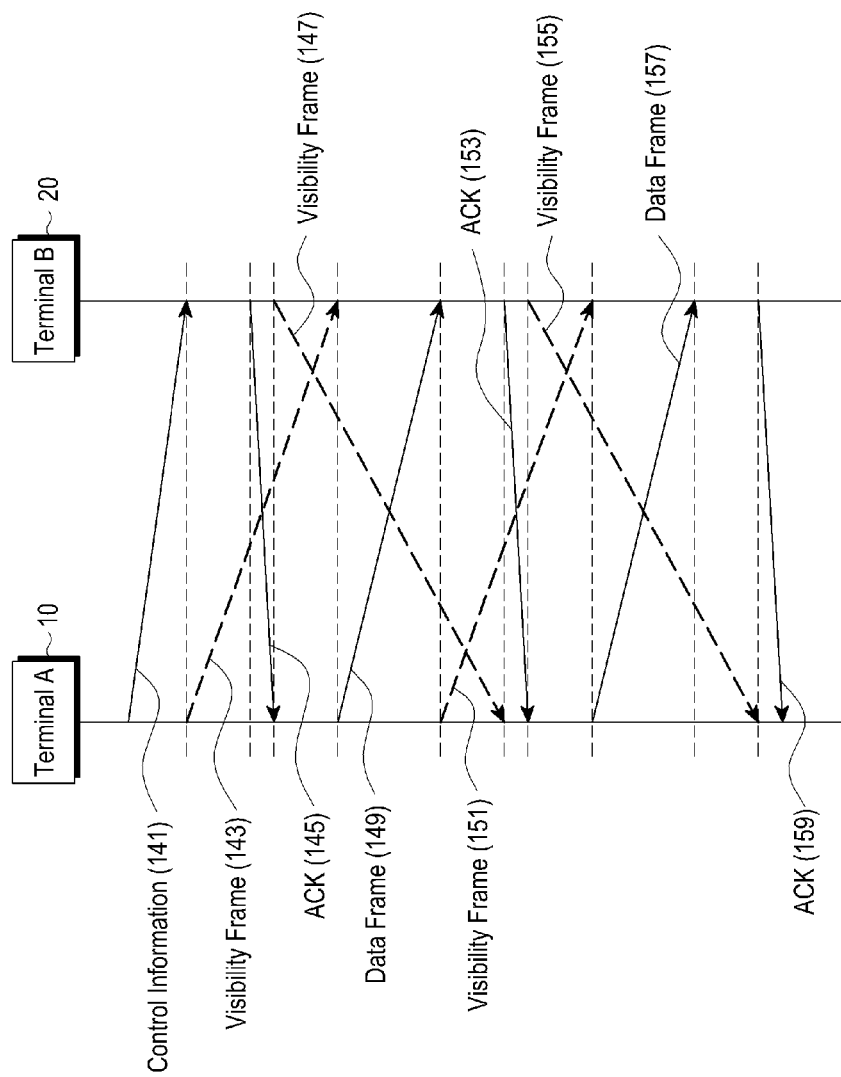
FIG. 2 is a diagram illustrating an example of a general visibility frame transmitting process.

FIG. 2 is a diagram illustrating an example of a general visibility frame transmitting process for improving visibility effects in a VLC system.

Referring to FIG. 2, data is transmitted and received between the terminal A 10 and the terminal B 20, and a visibility frame is output when no data is transmitted. Generally, when no data is transmitted, when two VLC devices are misaligned with each other, or when a data transmission error occurs, a visibility frame is output. More specifically, a visibility frame is transmitted when no data is transmitted, in order to improve visibility effects in transmission and reception ends of the VLC communications. The output of the visibility frame may be directed towards a certain terminal.

Referring to FIG. 2, the terminal A 10 transmits control information to the terminal B 20 in step 141, and outputs a visibility frame in step 143. The terminal B 20, upon receiving the control information, transmits an ACK to the terminal A 10 in step 145, and outputs a visibility frame in step 147. In step 149, the terminal A 10, which has received the ACK, stops outputting the visibility frame in order to transmit a data frame to the terminal B 20. The terminal A 10 outputs another visibility frame, in step 151, upon completion of transmission of the data frame. The terminal B 20, upon receiving the data frame in step 149, stops outputting the visibility frame in order to transmit an ACK in step 153. The terminal B 20 outputs the visibility frame in step 155 upon completion of transmission of the ACK. In steps 157 and 159, a process for data frame transmission is performed in a manner similar to that described above with respect to steps 149 and 153.

In a general VLC system, a sleep mode is applied to reduce power consumption. However, the sleep mode has effects that are opposite to the effects of visible frame transmission. More specifically, the sleep mode is intended to prevent power consumption in a non-data-transmission period; whereas the visibility frame is output in the non-data-transmission period, thus increasing power consumption. Therefore, there is a need for an effective way to apply output of the visibility frame in the sleep mode.

In the VLC system according to embodiments of the present invention, a visibility frame and a sleep mode for reducing power consumption are applied at the same time. The visibility frame is a frame transmitted for visibility effects, and is transmitted in a communication period irrelevant to data transmission. The sleep mode is applied to a non-data-transmission period to reduce power consumption of a terminal. By applying advantages of the two conflicting functions to the VLC system, embodiments of the present invention improve system efficiency.

To this end, according to embodiments of the present invention, a determination of whether to output the visibility frame is performed according to whether the sleep mode is set. More specifically, output of the visibility frame while the sleep mode is maintained may be restricted, regardless of a type of the sleep mode. Alternatively, output of the visibility frame may be restricted according to a type of the sleep mode. The sleep mode may be divided into a periodic sleep mode and an aperiodic sleep mode according to the present invention. The periodic sleep mode is a sleep mode in which a sleep window and a listening window have uniform sizes and are periodically repeated. The aperiodic sleep mode is a sleep mode in which a sleep window and a listening window may have random sizes. According to an embodiment of the present invention, a visibility frame is normally transmitted in the periodic sleep mode; transmission of the visibility frame is restricted in the aperiodic sleep mode. Alternatively, transmission of the visibility frame may be restricted in the periodic sleep mode; the visibility frame may be transmitted normally in the aperiodic sleep mode.

Figure 3:
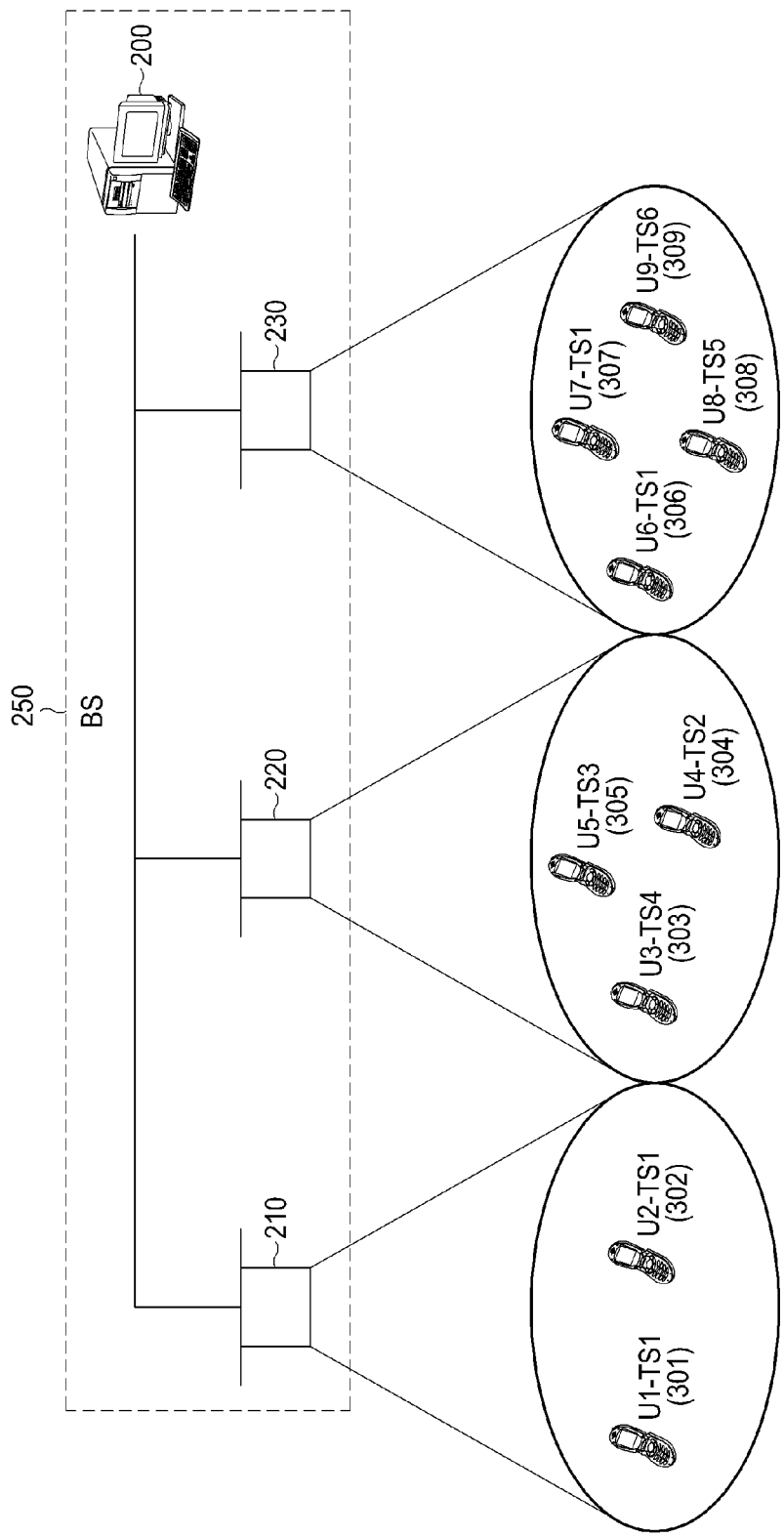
FIG. 3 is a diagram illustrating a Visible Light Communication (VLC) system according to an embodiment of the present invention.

FIG. 3 illustrates an example of a VLC system according to an embodiment of the present invention.

Referring to FIG. 3, the VLC system includes a plurality of VLC devices such as a Base Station (BS) and a VLC terminal. The BS includes at least one light source and a communication control device. The BS may also serve as an Access Point (AP). Herein, "light source" refers to a means for transmitting light and/or receiving transmitted light (e.g., light corresponding to VLC communications). The VLC terminal includes a visible light transmission/reception module to transmit data to and receive data from the BS through the light source or transmit data to and receive data from another VLC terminal. The VLC terminal may be a portable terminal such as a cellular phone or a Personal Digital Assistant (PD) or may be a fixed terminal such as a desktop computer.

FIG. 3 illustrates a case where data is transmitted and received between the BS and the plurality of VLC terminals in the VLC system. As shown in FIG. 3, the VLC system includes a BS 250, which includes one or more light sources 210, 220, and 230 and a communication control device 200. The VLC system further includes VLC terminals 301, 302, 303, 304, 305, 306, 307, 308, and 309.

The VLC terminals 301, 302, 303, 304, 305, 306, 307, 308, and 309, when located in coverages of the light sources 210, 220, and 230, respectively, receive beacon messages from the light sources 210, 220, and 230. The VLC terminals 301, 302, 303, 304, 305, 306, 307, 308, and 309 then perform time synchronization by using frame sync included in the beacon messages, and transmit an initial connection request to the light sources 210, 220, and 230 using a predefined common time slot channel.

The VLC terminals 301, 302, 303, 304, 305, 306, 307, 308, and 309 receive information about time slot channels allocated thereto through the light sources 210, 220, and 230. The VLC terminals 301, 302, 303, 304, 305, 306, 307, 308, and 309 then transmit and receive data through VLC by using the allocated time slot channels.

The light sources 210, 220, and 230 have light source IDentifiers (IDs) uniquely allocated thereto, and transmit transmission data received from the communication control device 200 to the VLC terminals 301, 302, 303, 304, 305, 306, 307, 308, and 309 located in their coverages. The light sources 210, 220, and 230 transmit reception data received from the VLC terminals 301, 302, 303, 304, 305, 306, 307, 308, and 309 to the communication control device 200. At this time, the light sources 210, 220, and 230 transmit their light source IDs through the reception data to the communication control device 20. The light sources 210, 220, and 230 also periodically broadcast beacon messages including frame sync to allow the VLC terminals 301, 302, 303, 304, 305, 306, 307, 308, and 309 located in their coverages to perform synchronization.

The communication control device 200 processes the transmission data to be transmitted to the VLC terminals 301, 302, 303, 304, 305, 306, 307, 308, and 309, transmits the processed transmission data to the VLC terminals 301, 302, 303, 304, 305, 306, 307, 308, and 309 through the light sources 210, 220, and 230, and processes the reception data received from the VLC terminals 301, 302, 303, 304, 305, 306, 307, 308, and 309 through the light sources 210, 220, and 230.

According to an embodiment of the present invention, the communication control device 200 manages time slot channels and allocates a particular time slot channel to be used in a VLC terminal. A time slot channel allocated to a VLC terminal may be classified for uplink or downlink. In channel allocation, the communication control device 200 allocates a proper time slot channel by referring to various factors such as a current channel allocation state, a type of transmission data, a type of a service mode, a type of a data transmission mode, and an available time slot channel for a VLC terminal at the time of allocation. The service mode may be any of types including an Information Broadcasting (IB) mode, a Visible Local Area Network (VLAN) mode, and a peer-to-peer communication mode. The data transmission mode may be any of broadcasting, multicasting, and unicasting transmission modes.

The communication control device 200 properly sets a sleep mode for a VLC terminal according to a data transmission schedule or at the request of the VLC terminal. The communication control device 300 also transmits data to and receives data from the VLC terminal according to whether the sleep mode is set. Visibility frame transmission of the VLC terminal may be restricted according to whether the sleep mode is set or according to a type of the set sleep mode.

Figure 4:
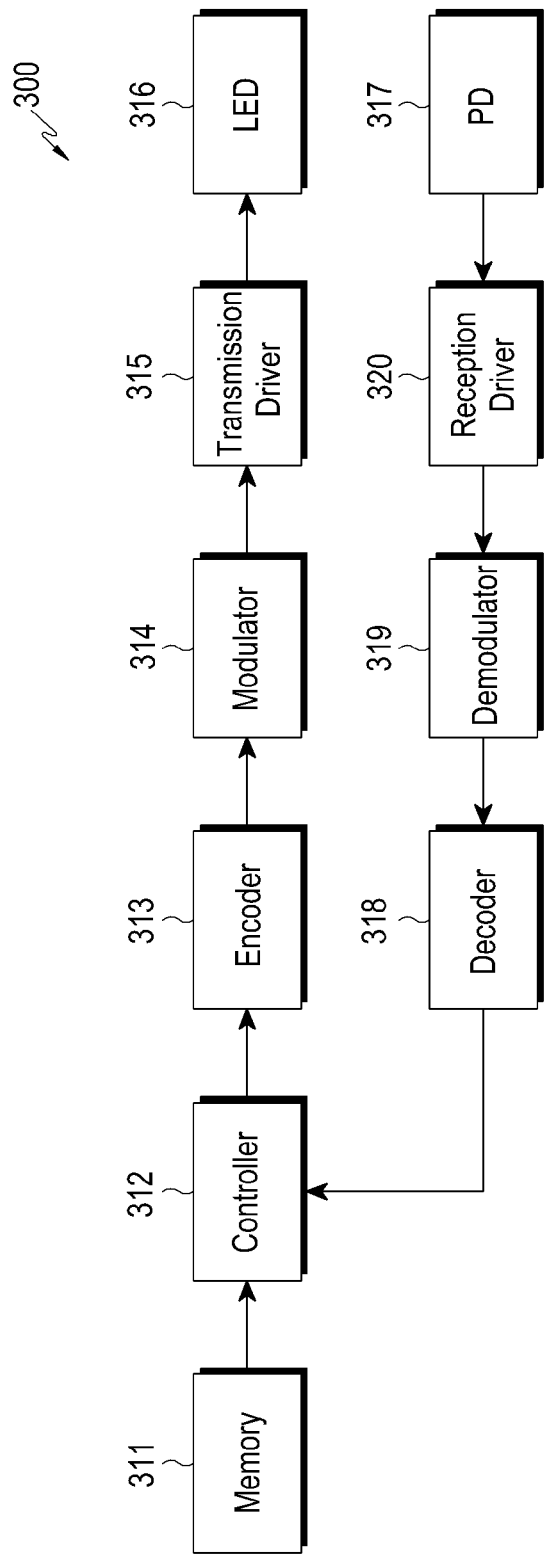
FIG. 4 is a block diagram of a VLC device according to an embodiment of the present invention.

FIG. 4 is a block diagram illustrating a VLC device 300 according to an embodiment of the present invention.

Referring to FIG. 4, the VLC device 300 may include a memory 311, a controller 312, an encoder 313, a modulator 314, a transmission driver 315, a Light Emitting Diode (LED) 316, a decoder 318, a demodulator 319, a reception driver 320, and a Photo Diode (PD) 317.

The controller 312 processes data for VLC data transmission/reception, controls the encoder 313 and the decoder 318, and controls the overall operation of the VLC device 300. Thus, the controller 312 controls components of the VLC device 300 according to an operating process of the VLC 300 described in further detail herein.

The encoder 313 encodes transmission data input from the controller 312 and outputs the encoded transmission data to the modulator 314. The modulator 314 modulates the input transmission data and outputs the modulated transmission data to the transmission driver 315.

The transmission driver 315, which is a driver of the LED 316, optically modulates the transmission data input from the modulator 314, and drives the LED 316.

The LED 316 is a light emitting device provided to deliver transmission data to an external device by using an optical signal. The LED 316 is driven by the transmission driver 315.

The Photo Diode (PD) 317 senses an optical signal delivered from an external device. The PD 317 receives an optical signal including reception data from a light source, converts the received optical signal into an electric signal, and outputs the electric signal to the reception driver 320.

The reception driver 320 is a driver for the PD 317, and adjusts a wavelength detection band of the PD 317. The reception driver 320 outputs the electric signal received from the PD 317 to the demodulator 319.

The demodulator 319 demodulates the electric signal received from the reception driver 320 into data corresponding to an optical wireless communication scheme, thus outputting the reception data to the decoder 318.

The decoder 318 decodes the input reception data and outputs the decoded reception data to the controller 312, which then appropriately processes the reception data received from the decoder 318.

The memory 311 stores a program for processing and controlling operations of the controller 312, reference data, and various updatable storage data, and operates as a working memory of the controller 312.

The foregoing structure of the VLC device 300 can be applied to the BS (including the light sources 210, 220, and 230 and the communication control device 200) as well as the VLC terminals 301, 302, 303, 304, 305, 306, 307, 308, and 309. In the BS, each of the light sources 210, 220, and 230 may be configured to include the LED 316 and the PD 317 (or the transmission driver 315 and the reception driver 320). The communication control device 200 may also be configured to include the other components.

Figure 5A:
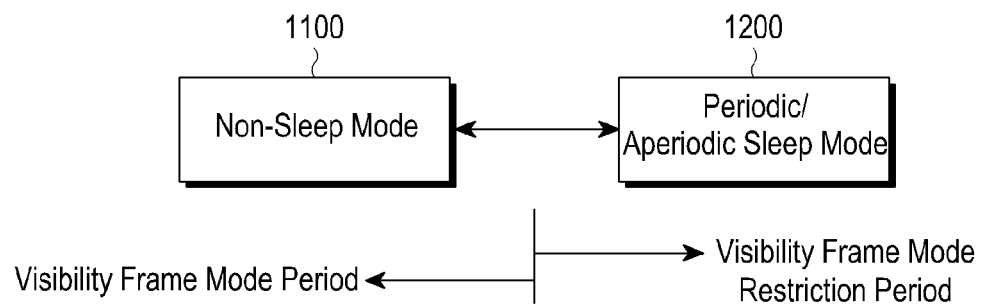
FIGS. 5A and 5B are diagrams illustrating a visibility frame mode restriction period in case of sleep mode setting according to an embodiment of the present invention.
Figure 5B:
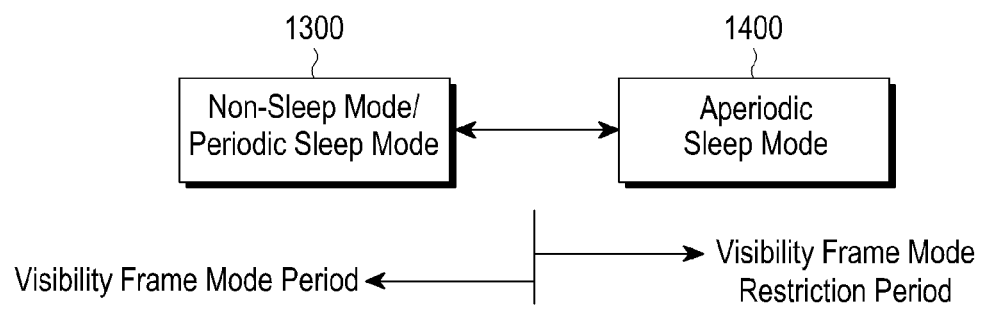

According to embodiments of the present invention, a determination of whether to output a visibility frame is performed according to whether a sleep mode is set in the above-described VLC device, such as illustrated in FIGS. 5A and 5B.

For example, output of a visibility frame may be restricted, regardless of a type of the sleep mode, when the sleep mode is set. Referring to FIG. 5A, in a non-sleep mode 1100 (i.e., in a period when the sleep mode is not set), a visibility frame mode period is set. In a periodic/aperiodic sleep mode 1200, a visibility frame mode restriction period is set. The visibility frame mode period may also be restricted in some cases during the non-sleep mode 1100, but in the embodiment shown in FIG. 5A, output of the visibility frame is restricted in the sleep mode 1200.

As another example, output of the visibility frame may be restricted selectively according to a type of the set sleep mode. Referring to FIG. 5B, in a non-sleep mode or a periodic sleep mode 1300, a visibility frame mode period is set in which a visibility frame can be transmitted; in an aperiodic sleep mode 1400, a visibility frame mode restriction period is set in which transmission of the visibility frame is restricted.

According to another embodiment of the present invention, transmission of a visibility frame may be restricted in a periodic sleep mode and the visibility frame may be transmitted in an aperiodic sleep mode.

In a BS according to embodiments of the present invention, such as described with respect to FIG. 3, a visibility frame mode restriction period may be set only in a VLC device corresponding to a reception end. When a VLC device corresponding to a transmission end of a data service and a VLC device corresponding to a reception end are portable terminals according to embodiments of the present invention, a visibility frame mode restriction period may be set equally in both of the VLC devices (i.e., both the transmission and reception end).

To this end, according to an embodiment of the present invention, a sleep request message SLP-REQ and a sleep response message SLP-RSP are used to set a periodic sleep mode, and an aperiodic sleep request message SLP-AREQ and an aperiodic sleep response message SLP-ARSP to set an aperiodic sleep mode, as shown in Table 4.

TABLE 4

| Type | Message Name | Message Description |
|---|---|---|
| 0 | Null | No Management Message |
| 1 | AS-REQ | Association Request Message |
| 2 | AS-RSP | Association Response Message |
| 3 | DAS-REQ | Disassociation Request Message |
| 4 | DAS-RSP | Disassociation Response Message |
| 5 | ARQ-FBK | ARQ Feedback Message |
| 6 | AS-ACK | Association Acknowledgement Message |
| 7 | DAS-ACK | Disassociation Acknowledgement Message |
| 8 | SLP-REQ | Sleep Request Message |
| 9 | SLP-RSP | Sleep Response Message |
| 10 | SLP-AREQ | Sleep Aperiodic Request Message |
| 11 | SLP-ARSP | Sleep Aperiodic Response Message |
| 12~255 | Reserved | Reserved |

According to an embodiment of the present invention, the SLP-REQ message for setting a periodic sleep mode is configured as shown in Table 5, and the SLP-RSP message is configured as shown in Table 6.

TABLE 5

| Syntax | Size (bits) | Description |
|---|---|---|
| Management Message Type = 8 | | Sleep Request Message |
| Operation | 2 | 0 = Power Saving Deactivation Request<br>1 = Power Saving Activation Request<br>2 = Reserved<br>3 = Reserved |
| Sleep Start | 4 | If Operation == 1<br>Time to First Sleep Window<br>Else 0 |
| Sleep Window | 4 | If Operation == 1<br>Sleep Window Size<br>Else 0 |

TABLE 5-continued

| Syntax | Size (bits) | Description |
|---|---|---|
| Listening Window | 4 | If Operation == 1<br>Listening Window Size<br>Else 0 |
| VF Mode Change | 1 | If Periodic Operation == 1<br>VF Mode Stop Approved<br>If Periodic Operation == 0<br>VF Mode |
| Reserved | 1 | |

TABLE 6

| Syntax | Size (bits) | Description |
|---|---|---|
| Management Message Type = 9 | | Sleep Response Message |
| Operation | 2 | 0 = Approved, Deactivation of Power Saving<br>1 = Approved, Activation of Power Saving<br>2 = Not Approved<br>3 = Reserved |
| Sleep Start | 4 | If Operation == 1<br>Time to First Sleep Window<br>Else 0 |
| Sleep Window | 4 | If Operation == 1<br>Sleep Window Size<br>Else 0 |
| Listening Window | 4 | If Operation == 1<br>Listening Window Size<br>Else 0 |
| VF Mode Change | 1 | If Periodic Operation == 1<br>VF Mode Stop Approved<br>If Periodic Operation == 0<br>VF Mode |
| Reserved | 1 | |

According to an embodiment of the present invention, the SLP-AREQ message is configured as shown in Table 7, and the SLP-ARSP message is configured as shown in Table 8.

TABLE 7

| Syntax | Size (bits) | Description |
|---|---|---|
| Management Message Type = 10 | | Aperiodic Sleep Request Message |
| Aperiodic Operation | 2 | 0 = Power Saving Deactivation Request<br>1 = Power Saving Activation Request<br>2 = Reserved<br>3 = Reserved |
| Aperiodic Sleep Window Size | 4 | If Aperiodic Operation == 1<br>Aperiodic Sleep Window Size<br>Otherwise 0 |
| Aperiodic Listening Window Size | 4 | If Aperiodic Operation == 1<br>Aperiodic Listening Window Size<br>Otherwise 0 |
| VF Mode Change | 1 | If Aperiodic Operation == 1<br>VF Mode Stop<br>If Aperiodic Operation == 0<br>VF Mode |
| Reserved | 1 | |

TABLE 8

| Syntax | Size (bits) | Description |
| --- | --- | --- |
| Management Message Type = 11 | | Aperiodic Sleep Response Message |
| Aperiodic Operation | 2 | 0 = Approved, Deactivation of Power Saving<br>1 = Approved, Activation of Power Saving<br>2 = Not Approved<br>3 = Reserved |
| Aperiodic Sleep Window Size | 4 | If Aperiodic Operation = = 1 Aperiodic Sleep Window Size Otherwise0 |
| Aperiodic Listening Window Size | 4 | If Aperiodic Operation = = 1 Aperiodic Listening Window Size Otherwise0 |
| VF Mode Change | 1 | If Aperiodic Operation = = 1 VF Mode Stop Approved<br>If Aperiodic Operation = = 0 VF Mode |
| Reserved | 1 | |

Referring to Tables 5 and 6, the SLP-REQ message and the SLP-RSP message include similar types of information, as a sleep start time (or frame) and sizes of a sleep window and a listening window, which are necessary for sleep mode setting, may be included in both a request for the sleep mode and a response to the request, respectively. This case may also be applied to the SLP-AREQ message and the SLP-ARSP message. Visibility Frame (VF) mode change information (or VF Mode Change Syntax) included in each message indicates whether to restrict transmission of a visibility frame in a sleep mode, such that a visibility frame mode restriction period is applied to the sleep mode according to a value allocated to the VF mode change information.

When a visibility frame mode is restricted in any sleep mode as shown in FIG. 5A, to set the sleep mode, a VLC device allocates a value indicating restriction of the visibility frame mode to the VF mode change information of the SLP-REQ message or the SLP-AREQ message transmitted to another VLC device that currently transmits and receives data. In this state, a value allocated to the VF mode change information of the SLP-RES message or the SLP-ARES message is also maintained as a value indicating restriction of the visibility frame mode.

The restriction of the visibility frame mode in each sleep mode may be determined in various ways according to embodiments of the present invention. In a communication environment where the BS provides a data service to the VLC terminals as shown in FIG. 3, the BS may indicate in which sleep mode the visibility frame mode is restricted through control information and provides the indicated information to the VLC terminals through the control information. Thus, when the VLC terminals request sleep mode setting, the value of the VF mode change information of the SLP-REQ message or the SLP-AREQ message is set according to the information indicated by the BS.

As another example, instead of indicating, in advance, in which sleep mode the visibility frame mode is restricted, the BS may transmit, through the SLP-RES message, information about whether to approve the VF mode change information included in the SLP-REQ message of a VLC terminal. In this case, the approval may also be indicated by using the value of the VF mode change information.

As another example, when VLC is performed between VLC terminals, a sleep mode may be determined in which the visibility frame mode is restricted according to a selection of a user of one of the VLC terminals. In this case, the VLC terminal configures the SLP-REQ message or the SLP-AREQ message according to a restriction value set by the user and transmits the message. The VLC terminal that receives the SLP-REQ message or the SLP-AREQ message restricts output of the visibility frame in a corresponding sleep mode according to VF mode change information included in the received message. Alternatively, output of the visibility frame at a transmitting VLC terminal may also be controlled by changing a value of VF mode change information of the SLP-RES message or the SLP-ARES message into another value and transmitting the changed value.

Figure 6A:
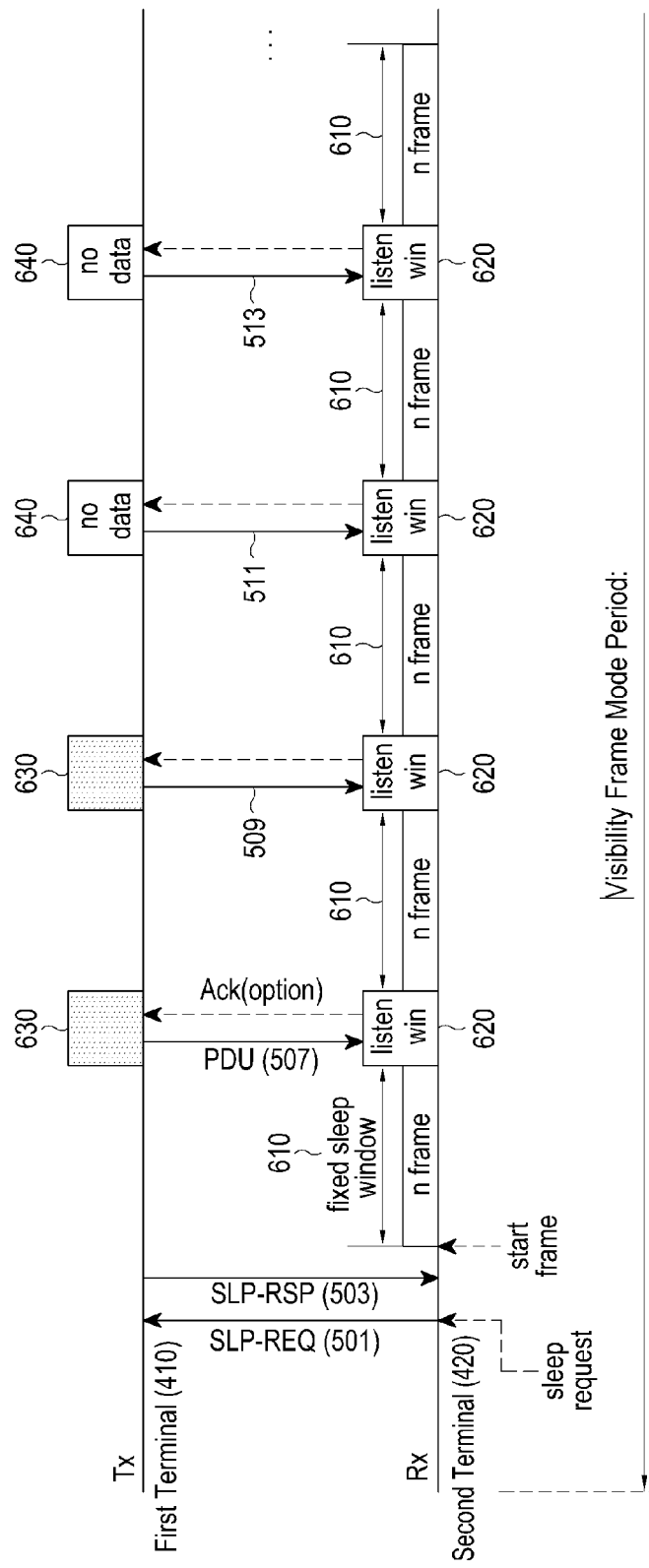
FIGS. 6A through 8C are diagrams illustrating a sleep mode setting process according to embodiments of the present invention.
Figure 6B:
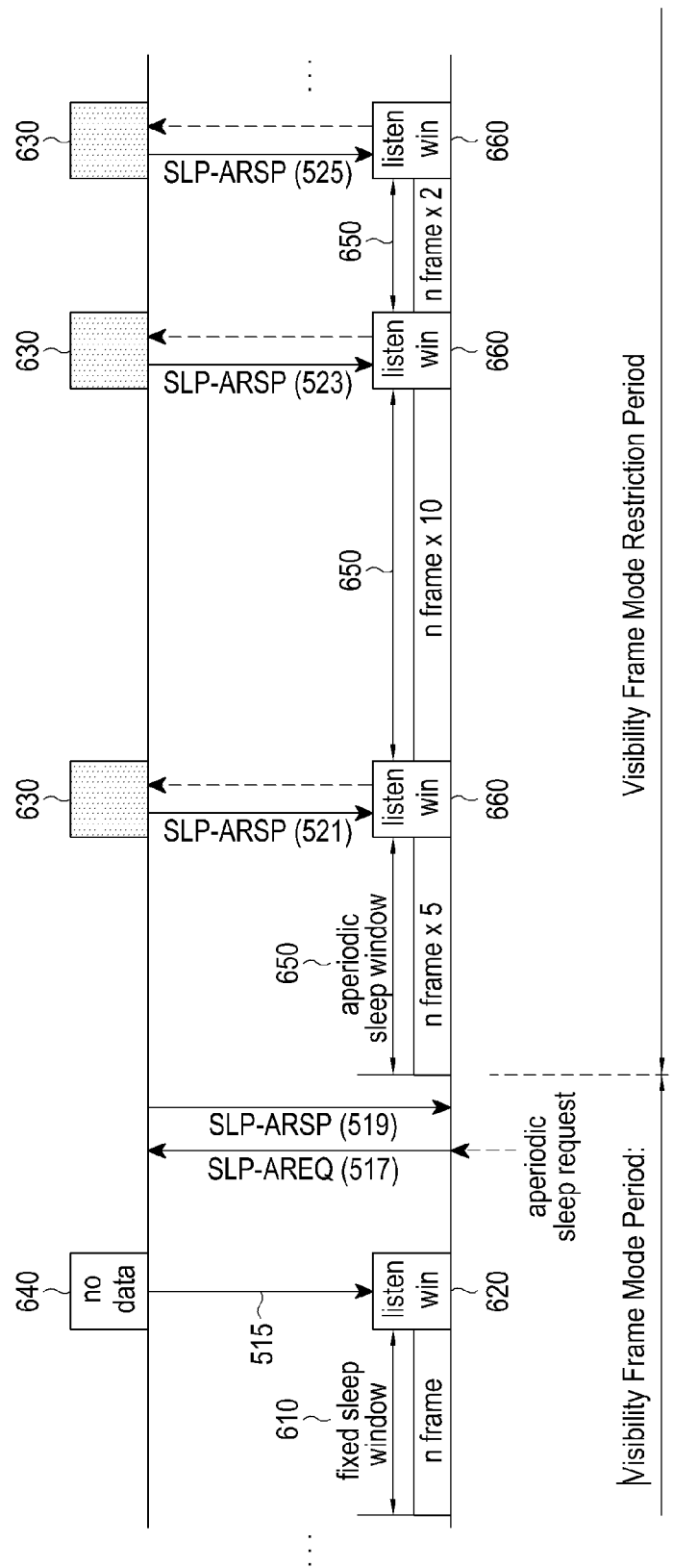
Figure 6C:
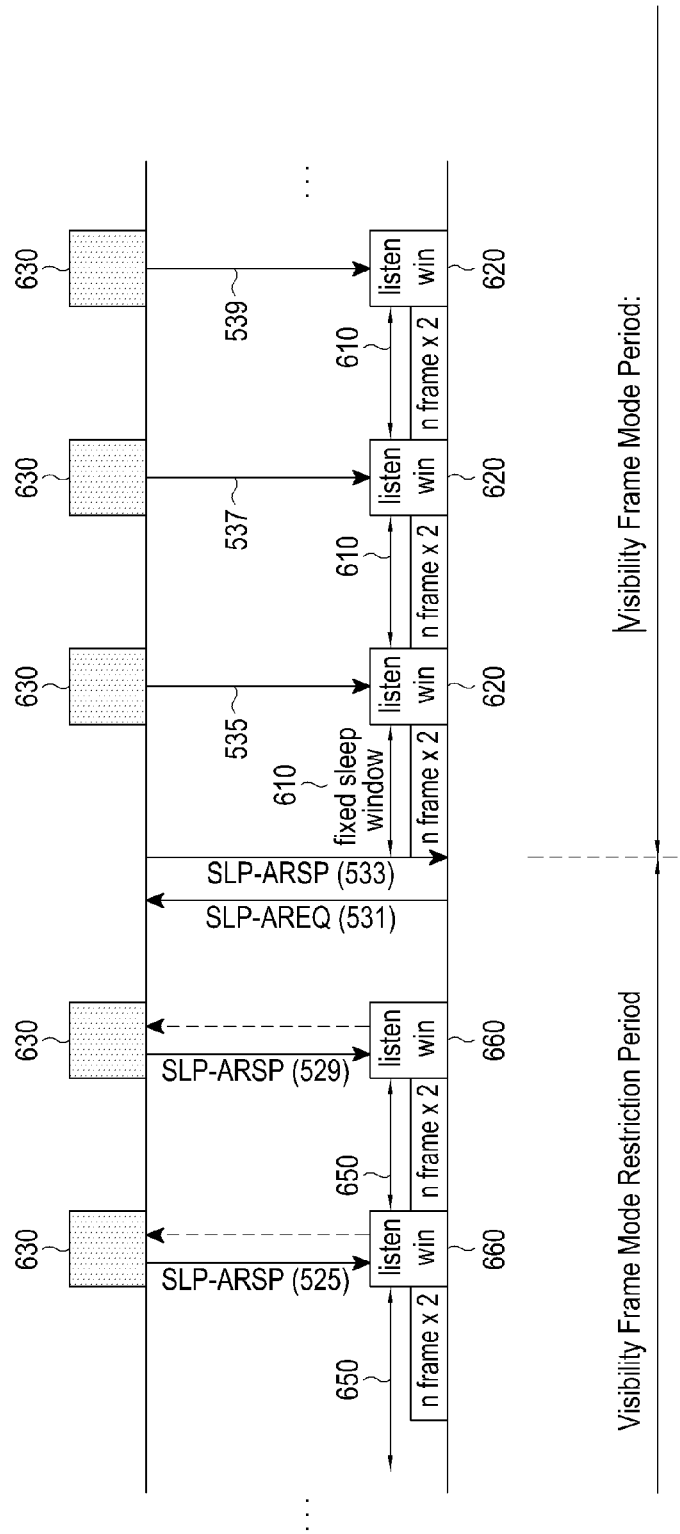

FIGS. 6A through 6C, illustrate a process of setting a periodic sleep mode and an aperiodic sleep mode and setting a visibility frame mode restriction period according to setting of the sleep mode according to an embodiment of the present invention.

In the examples illustrated in FIGS. 6A through 6C, a reception end for receiving data sets a sleep mode and sets a visibility frame mode restriction period is set according to a type of the sleep mode. Hence, in FIGS. 6A through 6C, a first terminal 410 is a VLC device for transmitting data and a second terminal 420 is a VLC device for receiving the transmitted data. The visibility frame mode period and the visibility frame mode restriction period are equally applied to the first terminal 410 and the second terminal 420. In FIGS. 6A through 6C, operations of the first terminal 410 and the second terminal 420 are controlled by the controller 312 included in each of the first terminal 410 and the second terminal 420.

Referring to FIG. 6A, if no data is received from the first terminal 410 for a predetermined frame or a predetermined period of time, the second terminal 420 transmits a sleep request message SLP-REQ requesting setting of a periodic sleep mode in step 501. A determination of whether to set the periodic sleep mode is performed according to a transmission/reception state of data. In the present example, a predetermined period, during which no reception data is received, is a criterion for the determination. The predetermined period may vary according to a communication system environment.

The first terminal 410, after receiving the SLP-REQ message, transmits a sleep response message SLP-RSP in response to the SLP-REQ message, in step 503.

Each terminal may identify the SLP-REQ message used in step 501 and the SLP-RSP message used in step 503 by checking control information included in the messages, or by sharing a common message type, such as a message type according to Table 4.

For example, if the second terminal 420 sets a value of management message type information (Management Message Type) to Type 8 of Table 4 in the SLP-REQ message configured as shown in Table 5 and transmits the SLP-REQ message to the first terminal 410, the first terminal 410, upon receiving the SLP-REQ message, detects Type 8 from the received SLP-REQ message, thus identifying the SLP-REQ message.

In the present example, the second terminal 420 sets operation information (e.g., an Operation Syntax) of the SLP-REQ message to Bit 1 (i.e., a bit value of '1') to request the periodic sleep mode. Thus, the first terminal 410 checks the operation information in the SLP-REQ message, thus recognizing that the received message is a message requesting Activation of Power Saving indicated by Bit 1. In the embodiment illustrated in FIGS. 6A through 6C, transmission of the visibility frame is maintained in the periodic sleep mode. Hence, the VF mode change information indicating whether to transmit a visibility frame is set to Bit 0, such that the visibility frame can be output in the periodic sleep mode.

The SLP-REQ message may include sleep start information (or Sleep Start Syntax), sleep window information (or Sleep Window Syntax) and listening window information (or Listening Window Syntax). The sleep start information is information about a sleep start time (or frame) for starting a sleep mode. The sleep window information indicates a time or period during which an idle state of a terminal is maintained. The listening window information indicates a time or period during which a normal state is maintained to transmit and receive data after the terminal wakes up from the idle state in the sleep mode.

The second terminal 420 may transmit the sleep start information, the sleep window information, and the listening window information through the SLP-REQ message. Alternatively, the second terminal 420 may transmit the SLP-REQ message, which does not include any valid sleep start information, sleep window information, and listening window information, to merely request entry to the periodic sleep mode. In this case, in step 501, the operation information of the SLP-REQ message may be set to Bit 1 and the VF mode change information of the SLP-REQ message may be set to Bit 0. Thus, upon receiving, from the second terminal 420, the SLP-REQ message where only the operation information and the VF mode change information are set, the first terminal 410 may transmit the SLP-RES message including sleep start information, sleep window information, and listening window information in response to the SLP-REQ message. That is, information necessary for maintaining the periodic sleep mode may be transmitted through the SLP-REQ message, or the SLP-REQ message may be used merely to request initiation of the periodic sleep mode and the information necessary for maintaining the periodic sleep mode may be included in the SLP-RES message. An Acknowledgement (ACK) message or a Negative-ACK (HACK) message for the SLP-REQ message or the SLP-RES message may be used to indicate whether the SLP-REQ message or the SLP-RES message has been properly received. According to some embodiments of the present invention, the above-described ACK/NACK function is optional.

According to an embodiment of the present invention, the VF mode change information included in the SLP-RES message is set to Bit 0 in step 503 to allow output of the visibility frame in the periodic sleep mode.

In step 503, the second terminal 420, upon receiving the SLP-RSP message, sets the periodic sleep mode from the sleep start time. More specifically, the second terminal 420 maintains an idle state during a sleep window period 610. Upon expiration of the sleep window period 610, the second terminal 420 returns to a normal state to receive data 630 transmitted from the first terminal 410 during a listening window period 620, in step 507. The operation according to step 507 is repeated in step 509. The data 630 may be a Packet Data Unit (PDU) transmitted through one or more data frames.

The second terminal 420 maintains transmission of the visibility frame in the periodic sleep mode in the same manner as in the non-sleep mode. Since the wakeup state or the idle state is periodically repeated in the periodic sleep mode, it is desirable to maintain transmission of the visibility frame in the periodic sleep mode.

In steps 511 of FIG. 6A through 515 of FIG. 6B, the second terminal 420 does not receive data from the first terminal 410 in the listening window period 620. As such, if no data frame is received for a predetermined time during operation in the periodic sleep mode, the second terminal 420 performs an operation for transition from the periodic sleep mode to the aperiodic sleep mode. In the aperiodic sleep mode, the sleep window period 610 may be set longer than in the periodic sleep mode, thereby reducing power consumption. Alternatively, the listening window period 620 may be maintained only during data transmission.

Referring to FIG. 6B, if no data is received for a predetermined time during the listening window period 620 after the periodic sleep mode is set, the second terminal 420 transmits an aperiodic sleep request message SLP-AREQ 533 to the first terminal 410 in step 517. The SLP-AREQ message may be used to request entry to the aperiodic sleep mode, so as to change a window size necessary for the sleep mode when no data is received for a predetermined time in the periodic sleep mode communication environment. The SLP-AREQ message may be configured according to Table 7, for example.

The first terminal 410, upon receiving the SLP-AREQ message, transmits an aperiodic sleep response message SLP-ARSP in response to the SLP-AREQ message, in step 519. The SLP-ARSP message may be configured according to Table 8, for example.

If the second terminal 420 sets a value of the management message type information to Type 10 of Table 4 in the SLP-AREQ message configured according to Table 7 and transmits the SLP-AREQ message to the first terminal 410, the first terminal 410, upon receiving the SLP-AREQ message, detects Type 10 from the SLP-AREQ message and identifies the SLP-AREQ message.

The second terminal 420 sets the operation information of the SLP-AREQ message to Bit 1 to request the aperiodic sleep mode. Accordingly, the first terminal 410 checks the operation information in the SLP-AREQ message, and recognizes that the received message is a message requesting activation of power saving a power saving mode, as indicated by the Bit 1.

In the embodiment of the present invention illustrated in FIGS. 6A through 6C, transmission of the visibility frame is restricted in the aperiodic sleep mode. Hence, the VF mode change information is set to Bit 1 in the SLP-AREQ message. Thus, the first terminal 410 and the second terminal 420 do not output the visibility frame in the aperiodic sleep mode environment. Since the idle state of the terminal may be maintained for a longer period in the aperiodic sleep mode than in the periodic sleep mode, power consumption of the terminal can be reduced by using the visibility frame in the aperiodic sleep mode.

The SLP-AREQ message may include sleep start information (or Sleep Start Syntax), aperiodic sleep window information (or Aperiodic Sleep Window Size Syntax), and aperiodic listening window information (or Aperiodic Listening Window Size Syntax). The sleep start information indicates a sleep start time for starting the aperiodic sleep mode and the aperiodic sleep window information indicates a time or period during which the idle state of the terminal is maintained. The aperiodic listening window information indicates a time or period during which the normal state is maintained to transmit and receive data after the terminal wakes up from the idle state in the sleep mode. The size of the aperiodic sleep window and the size of the aperiodic listening window are set at random. For example, an aperiodic sleep window period and an aperiodic listening window period may be determined according to a point in time at which there is transmission data.

The second terminal 420 may transmit the sleep start information, the aperiodic sleep window information, and the aperiodic listening window information through the SLP-AREQ message. Alternatively, the second terminal 420 may transmit the SLP-AREQ message, which does not include any valid sleep start information, aperiodic sleep window information, and aperiodic listening window information, to merely request entry to the periodic sleep mode.

Upon receiving, from the second terminal 420, the SLP-AREQ message where only operation information (or Operation Syntax) and VF mode change information (or VF Mode Change Syntax) are set, the first terminal 410 may transmit a SLP-ARES message including sleep start information (or Sleep Start Syntax), aperiodic sleep window information (or Aperiodic Sleep Window Size Syntax), and aperiodic listening window information (or Aperiodic Listening Window Size Syntax) in response to the SLP-AREQ message. As described above, information necessary for maintaining the aperiodic sleep mode may be transmitted through the SLP-AREQ message. Alternatively, the SLP-AREQ message may be used merely to request initiation of the aperiodic sleep mode and the information necessary for maintaining the aperiodic sleep mode may be included in the SLP-ARES message. Since the visibility frame is not transmitted in the aperiodic sleep mode according to the embodiment illustrated in FIGS. 6A through 6C, the VF mode change information is set to Bit 1.

Referring back to FIG. 6B, since the aperiodic sleep mode is mainly intended to return the terminal to the normal state when there is data to be transmitted, it is desirable for a transmission end to transmit data for setting sleep start information, aperiodic sleep window information, and aperiodic listening window information. Thus, information necessary for maintaining the aperiodic sleep mode may be included in the SLP-ARES message. Hence, the second terminal 420 recognizes information included in the SLP-ARES message received in step 519, and sets a sleep mode in which restriction of transmission of the visibility frame, the aperiodic sleep window period, and the aperiodic listening window period are executed.

More specifically, the second terminal 420 starts a first aperiodic sleep window period 650 at a sleep start time, and upon expiration of the aperiodic sleep window period 650, the second terminal 420 wakes up and starts an aperiodic listening window period 660. In the aperiodic listening window period 660, the second terminal 420 receives the data 630 together with the SLP-ARES message. Due to characteristics of the aperiodic sleep mode, next aperiodic sleep window period 650 and aperiodic listening window period 660 may be different from previous aperiodic sleep window period 650, and aperiodic listening window period 660 and a data transmission schedule may also be changed. Therefore, the SLP-ARES message is transmitted again in the aperiodic listening window period 650. Thus, the aperiodic sleep window period 650 and the aperiodic listening window period 660 are set according to the most recently received SLP-ARES message. Referring to FIGS. 6B and 6C, this process is repeated in steps 521 through 527. The aperiodic sleep mode prevents unnecessary wakeup through its various sleep window sizes. As in an interval between steps 521 and 523, during a long frame, the idle state is maintained, thereby extending a wakeup period when there is no data frame.

In the aperiodic sleep mode, the aperiodic sleep window period 650 and the aperiodic listening window period 660 may be repeated periodically. In this case, transition to the periodic sleep mode is desirable. Thus, if the aperiodic sleep window period 650 and the aperiodic listening window period 660 are repeated periodically during a predetermined time, the second terminal 420 transmits the SLP-REQ message to the first terminal 410 in step 531.

After the periodic sleep mode is reset, an operating process similar to that in steps 501 through 509 is performed again in steps 531 through 537. In the SLP-REQ message for requesting transition to the periodic sleep mode, Bit 0 is allocated to VF mode change information, in order to approve the visibility frame mode that has been restricted in the aperiodic sleep mode.

Figure 7:
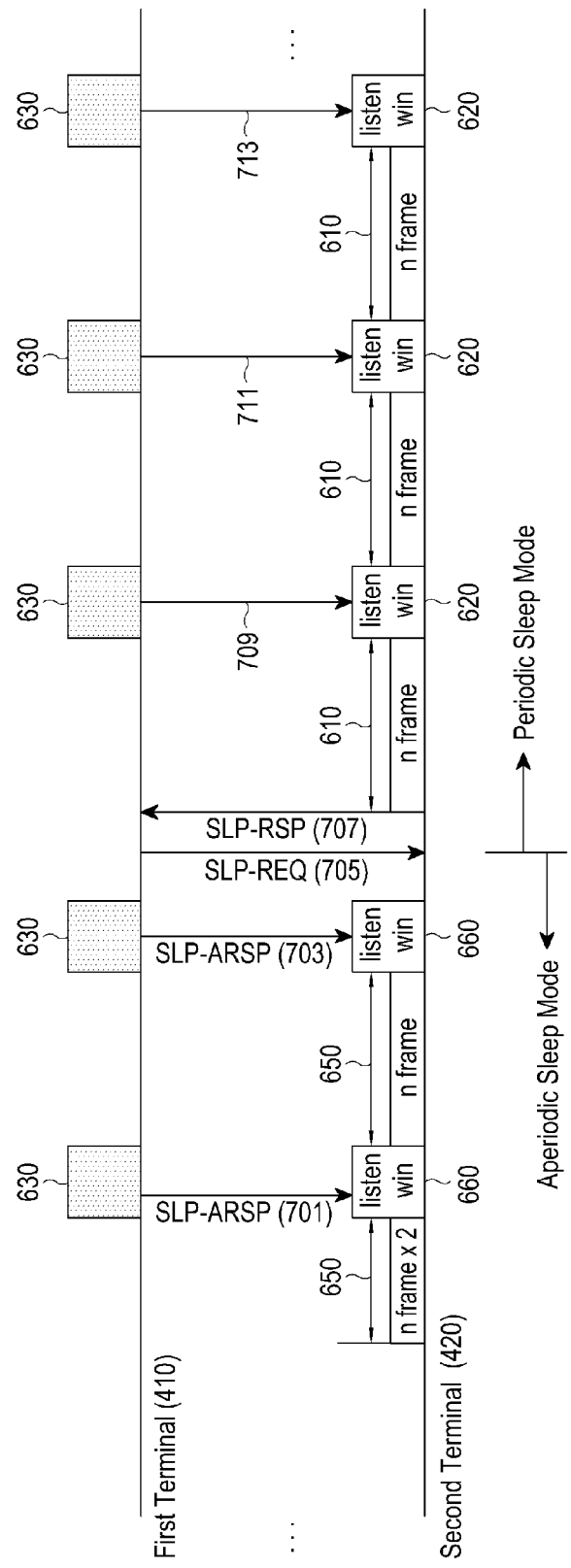

While the second terminal 420, which is a receiving terminal, requests transition from the aperiodic sleep mode to the periodic sleep mode, as described herein with respect to the foregoing embodiment of the present invention, the first terminal 410, which is a transmitting VLC device, may also request transition to the periodic sleep mode, as illustrated in FIG. 7.

Referring to FIG. 7, in steps 701 and 703, the first terminal 410 transmits, to the second terminal 420, the SLP-ARSP message together with data, during the aperiodic listening period 660 in the aperiodic sleep mode. Upon determining that data transmission can be periodically performed according to a data transmission schedule, the first terminal 410 transmits the SLP-REQ message to the second terminal 420, in step 705. The SLP-REQ message may include sleep start information, sleep window information, and listening window information. The SLP-REQ message may further include VF mode change information is allocated Bit 0 to activate transmission of the visibility frame.

The second terminal 420 transmits the SLP-RES message in step 707 and operates according to the periodic sleep mode in steps 709 through 713.

Figure 8A:
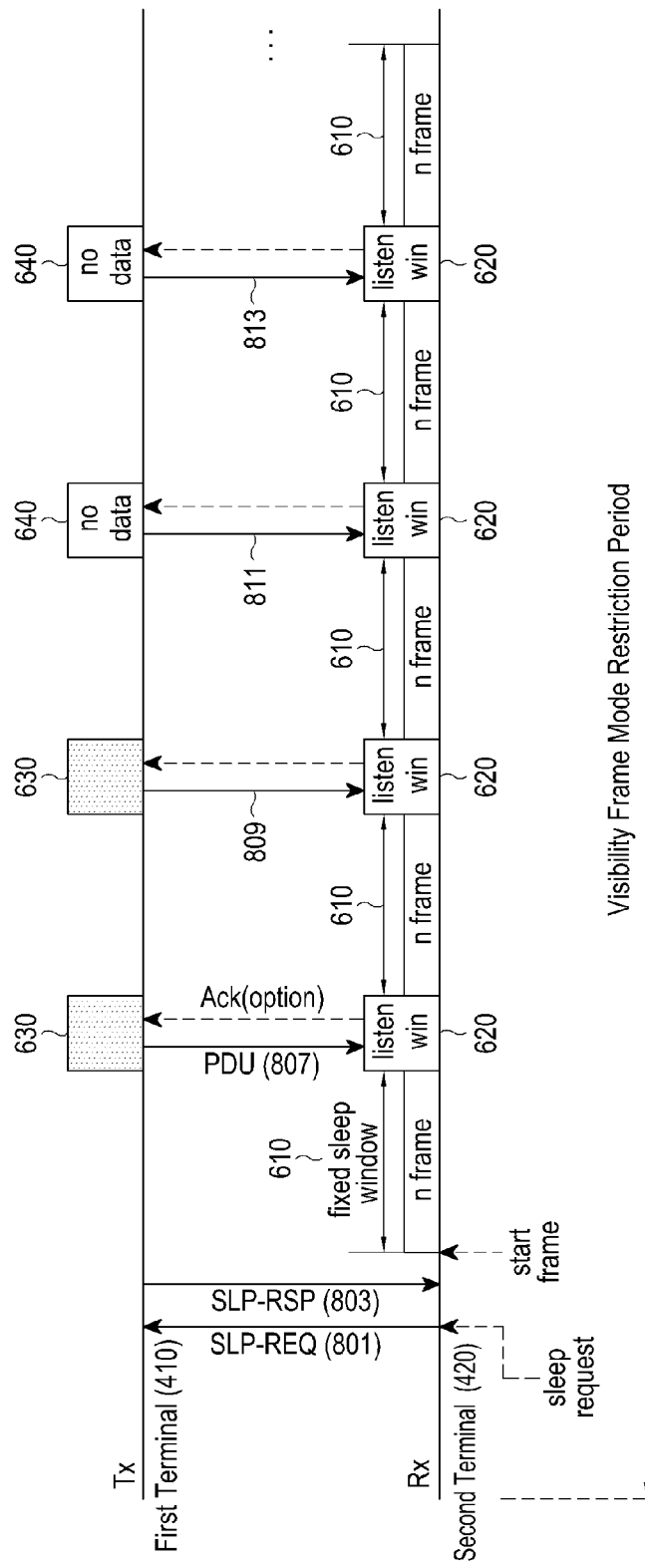
Figure 8B:
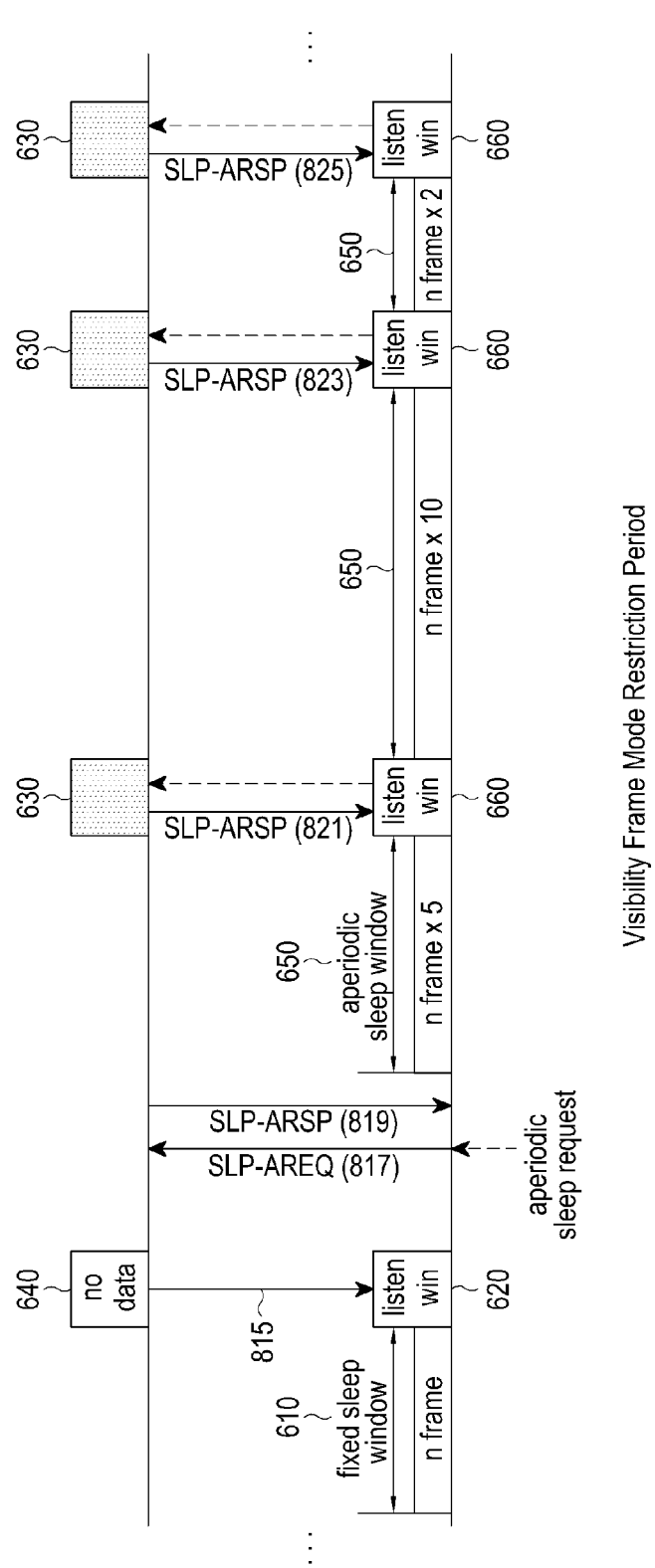
Figure 8C:
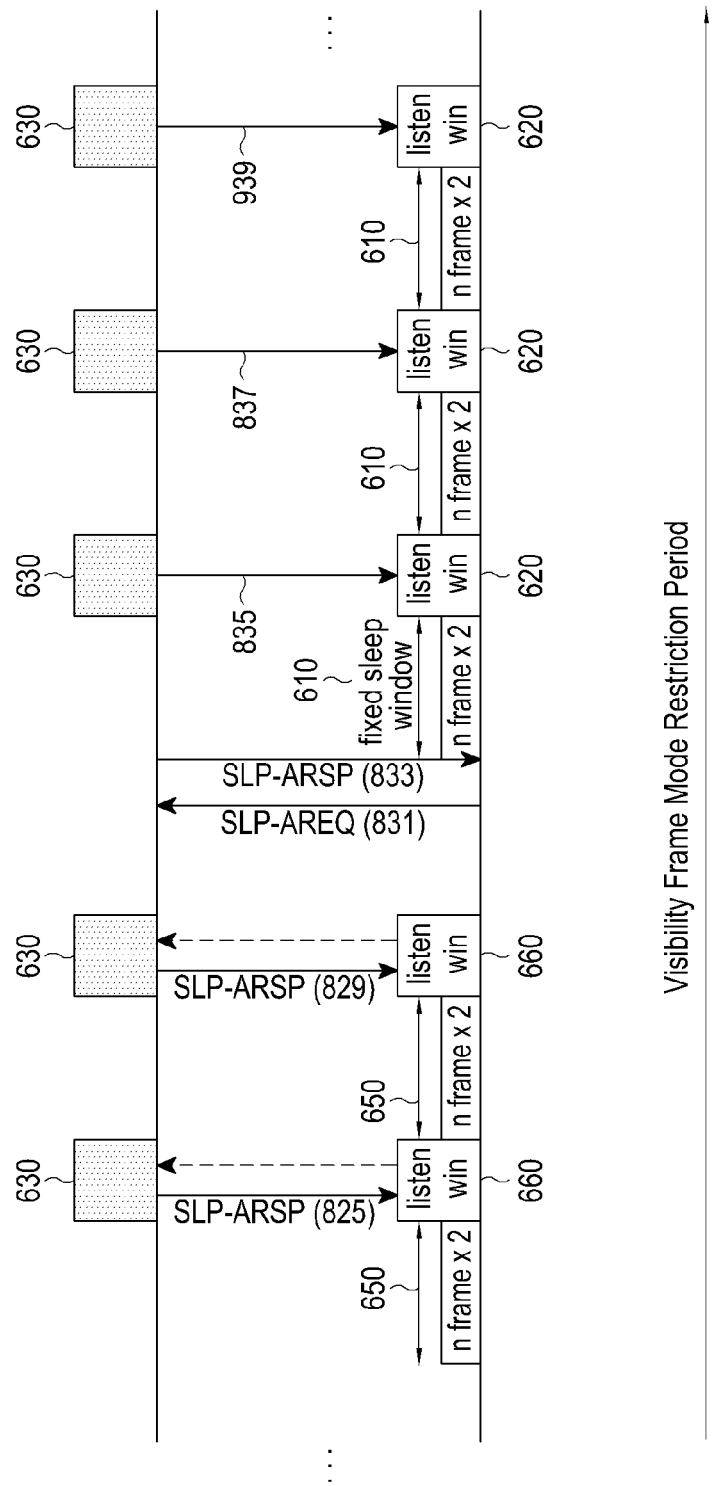

FIGS. 8A through 8C illustrate a case where the visibility frame mode is restricted in the sleep mode regardless of a type of the sleep mode, according to an embodiment of the present invention.

Referring to FIG. 8A, the first terminal 410 and the second terminal 420 transmit and receive the SLP-REQ message and the SLP-RES message in steps 801 and 803, respectively, to set the periodic sleep mode. The VF mode change information of each of the SLP-REQ message and the SLP-RES message is set to a value indicating restriction of the visibility frame mode. Hence, the visibility frame mode is restricted from the start of the sleep mode to the termination of the sleep mode, such that the visibility frame is not output in steps 807 through 815.

According to this process, the aperiodic sleep mode is maintained. Further, in case of a transition to the aperiodic sleep mode, restriction of the visibility frame mode is maintained. More specifically, the first terminal 410 and the second terminal 420 transit to the aperiodic sleep mode from the periodic sleep mode by transmitting and receiving the SLP-AREQ message and the SLP-ARES message in steps 817 and 819, such that the aperiodic sleep mode is set in steps 821 through 829, but restriction of the visibility frame mode is maintained.

Even when the first terminal 410 and the second terminal 420 transition to the periodic sleep mode by transmitting and receiving the SLP-REQ message and the SLP-RES message in steps 831 and 833, output of the visibility frame is restricted.

When the sleep mode is maintained, communication misalignment may occur between VLC devices. Herein, communication misalignment refers to a state where, without going through a normal communication link disconnection process, any signal or information is not received from a counterpart device, or a signal including an error exceeding a threshold value is received. Such communication misalignment may occur when locations of a light emitting element of a transmission device and/or a photosensitive element of a reception device and/or a transmission/reception angle therebetween is out of a range in which a visible light signal can be received. The communication misalignment may also occur when an obstacle interrupting a communication path between the two devices abruptly appears. As such, if communication misalignment occurs during the sleep mode, the VLC device releases the sleep mode and outputs the visibility frame regardless of restriction of the visibility frame mode according to the present invention. This process of releasing the sleep mode is illustrated in FIG. 9.

Figure 9:
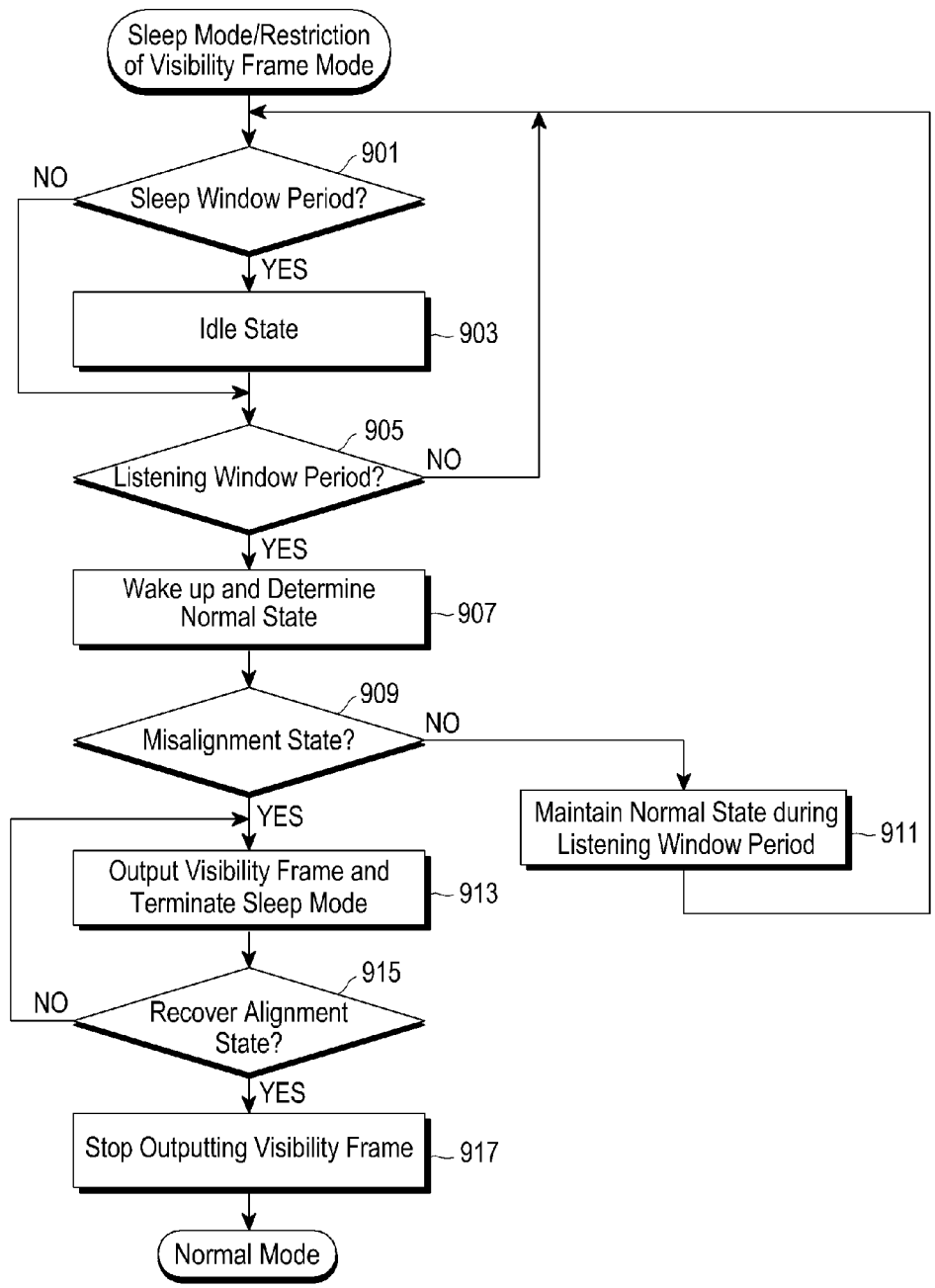
FIG. 9 is a flowchart illustrating an operating process of a VLC device according to an embodiment of the present invention.

Referring to FIG. 9, when the sleep mode is set and the visibility frame mode is restricted, if the VLC device is currently operating within the sleep window period, in step 901, the VLC device proceeds to step 903 to maintain the idle state. If the VLC device is not currently operating within the sleep window period, the VLC device determines whether the current time is included in the listening window period in step 905. If in the current period is the listening window period, the VLC device proceeds to step 907 to wake up and determine the normal state. In step 909, the VLC device determines whether communication misalignment occurs.

If no signal or data is received from a counterpart VLC device during the listening window period or an error rate of received data is higher than a threshold value, the VLC device determines that has communication misalignment occurred. If the VLC device determines that communication misalignment has not occurred, the VLC device proceeds to step 911 to maintain the normal state during the listening window period and returns to step 901.

Upon determining that communication misalignment occurs, the VLC device proceeds to step 913 to terminate the sleep mode and output the visibility frame. In this case, even when the visibility frame mode is currently restricted, the visibility frame is output. Hence, a user can observe output of the visibility frame by sight and can adjust a location of the VLC device for communication alignment or remove a communication obstacle.

The VLC device determines whether an alignment state is recovered in step 915 to output the visibility frame until the alignment state is recovered. If the alignment state is recovered, the VLC device goes to step 917 to stop outputting the visibility frame and operate in a normal mode.

Figure 10:
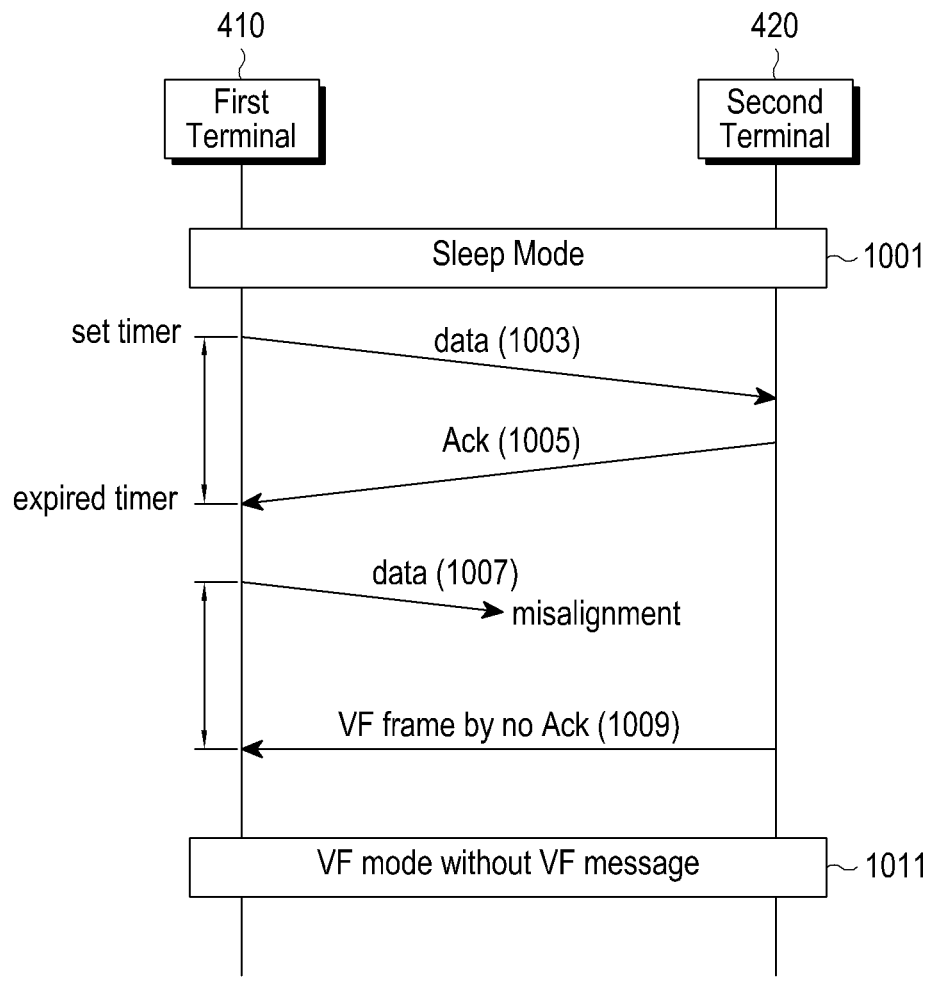
FIG. 10 is a diagram illustrating a visibility frame outputting process according to an embodiment of the present invention.

FIG. 10 is a diagram illustrating a process in which no ACK or NACK message, or no other response, has been received within a predetermined time after data transmission from an arbitrary terminal in the listening window period of the sleep mode is recognized as occurrence of misalignment, such that the visibility frame is output.

Referring to FIG. 10, the sleep mode is set between the first terminal 410 and the second terminal 420 in step 1001. In the embodiment of the present invention illustrated in FIG. 10, output of the visibility frame is restricted in the sleep mode, regardless of a type of the sleep mode. Thereafter, in the listening window period, the first terminal 410 transmits data to the second terminal 420 and sets a timer in step 1003. The timer is for counting a response waiting time. If an ACK message is received within the response waiting time, in step 1005, the first terminal 410 determines that the current state is an alignment state.

However, if the data transmitted from the first terminal 410 is not delivered to the second terminal 420 due to misalignment, as in step 1007, the first terminal 410 cannot receive the ACK message within the response waiting time. If misalignment occurs after the second terminal 420 receives the data, the first terminal 410 cannot receive the ACK message even if the second terminal 420 transmits the ACK message to the first terminal 410. For this reason, if no response is received within the response waiting time in step 1009, the second terminal 420 outputs the visibility frame immediately upon expiration of the response waiting time. Then, in step 1011, the visibility frame mode is set.

According to the foregoing described embodiments of the present invention, a VLC device corresponding to a reception end requests setting of the sleep mode in the non-sleep mode. However, a VLC device corresponding to a transmission end may also request setting of the sleep mode. Transition from the periodic sleep mode to the aperiodic sleep mode may also be requested by the VLC device corresponding to the transmission end. Thus, the SLP-REQ message, the SLP-RSP message, the SLP-AREQ message, and the SLP-ARSP message may be transmitted by the transmission end or the reception end in accordance with embodiments of the present invention.

While the present invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for transmitting a visibility frame according to setting of a mode in a Visible Light Communication (VLC) device in a VLC system including the VLC device and a VLC control device, the method comprising:
    receiving, by the VLC control device, a request message for requesting a periodic mode or an aperiodic mode of the VLC device, from the VLC device; and
    transmitting, by the VLC control device, a response message for executing the periodic mode or the aperiodic mode of the VLC device in response to the received request message, to the VLC device,
    wherein the request message includes information for indicating time of a first window period in which data transmission is stopped, information for indicating size of the first window period, and information for indicating size of a second window period in which data transmission can be performed in a normal state,
    wherein the response message includes information for indicating which of the periodic mode and the aperiodic mode of the VLC device to approve, information indicating size of the first window period, information indicating size of the second window period, and information for determining whether the VLC device transmits a visibility frame during the mode,
    wherein the information for determining whether to transmit the visibility frame is set to a value indicating restriction of transmission of the visibility frame, and
    wherein the periodic mode in which the first window period and the second window period are fixed is determined by the VLC device.

2. The method of claim 1, further comprising:
    after transmitting the response message, setting, by the VLC control device, a mode in which transmission of the visibility frame is approved if the information for determining whether to transmit the visibility frame is set to a value indicating approval of transmission of the visibility frame; and outputting the visibility frame if a misalignment state is sensed.

3. The method of claim 2, further comprising determining, by the VLC control device, that the misalignment state has occurred if a response to data transmitted from the VLC device to another VLC device has not been received within a response waiting time.

4. The method of claim 1, wherein the first window period and the second window period are random and are repeated aperiodically.

5. The method of claim 1, wherein the received request message includes information for requesting the periodic mode or the aperiodic mode of the VLC device, the first window period, the second window period, and the information for determining whether to transmit the visibility frame.

6. The method of claim 5, wherein the information for determining whether to transmit the visibility frame included in the received request message and the information for determining whether to transmit the visibility frame included in the response message are set to different values.

7. The method of claim 1, further comprising:
if no data is transmitted or received during a predetermined period after setting, by the VLC control device, the periodic mode, setting the aperiodic mode in which the first window period and the second window period are random.

8. The method of claim 7, further comprising, if the aperiodic mode is set, transmitting, by the VLC control device, a message including information indicating a next first window period and information indicating a next second window period during the second window period.

9. A Visible Light Communication (VLC) control device for transmitting a visibility frame according to setting of a mode in a VLC device in a VLC system including the VLC device and the VLC control device, the VLC control device comprising:
a transceiver for transmitting and receiving data and a message; and
a controller for receiving a request message for requesting a periodic mode or an aperiodic mode of the VLC device, through the transceiver, and transmitting a response message for executing the periodic mode or the aperiodic mode of the VLC device in response to the received request message, to the VLC device,
wherein the request message includes information for indicating time of a first window period in which data transmission is stopped, information for indicating size of the first window period, and information for indicating size of a second window period in which data transmission can be performed in a normal state, wherein the response message includes information for indicating which of the periodic mode and the aperiodic mode of the VLC device to approve, information indicating size of the first window period, information indicating size of the second window period, and information for determining whether the VLC device transmits a visibility frame during the mode,
wherein the information for determining whether to transmit the visibility frame is set to a value indicating restriction of transmission of the visibility frame, and
wherein the periodic mode in which the first window period and the second window period are fixed is determined by the VLC device.

10. The VLC control device of claim 9, wherein the controller, after transmitting the response message, sets a mode in which transmission of the visibility frame is approved if the information for determining whether to transmit the visibility frame is set to a value indicating approval of transmission of the visibility frame, and outputs the visibility frame if a misalignment state is sensed.

11. The VLC control device of claim 9, wherein the controller determines that the misalignment state has occurred if a response to data transmitted from the VLC device to another VLC device has not been received within a response waiting time.

12. The VLC control device of claim 9, wherein the first window period and the second window period are random and are repeated aperiodically.

13. The VLC control device of claim 9, wherein the received request message includes information for requesting the periodic mode or the aperiodic mode of the VLC device, the first window period, the second window period, and the information for determining whether to transmit the visibility frame.

14. The VLC control device of claim 13, wherein the information for determining whether to transmit the visibility frame included in the received request message and the information for determining whether to transmit the visibility frame included in the response message are set to different values.

15. The VLC control device of claim 9, wherein the controller sets the aperiodic mode in which the first window period and the second window period are random if no data is transmitted or received during a predetermined period after setting the periodic mode.

16. The VLC control device of claim 15, wherein the controller transmits a message including information indicating a next first window period and information indicating a next second window period during the second window period if the aperiodic mode is set.

* * * * *